Sept. 8, 1931.  H. HASTINGS  1,822,735
COMBINED LIQUID LEVEL AND PRESSURE INDICATING MECHANISM
Filed Nov. 27, 1925
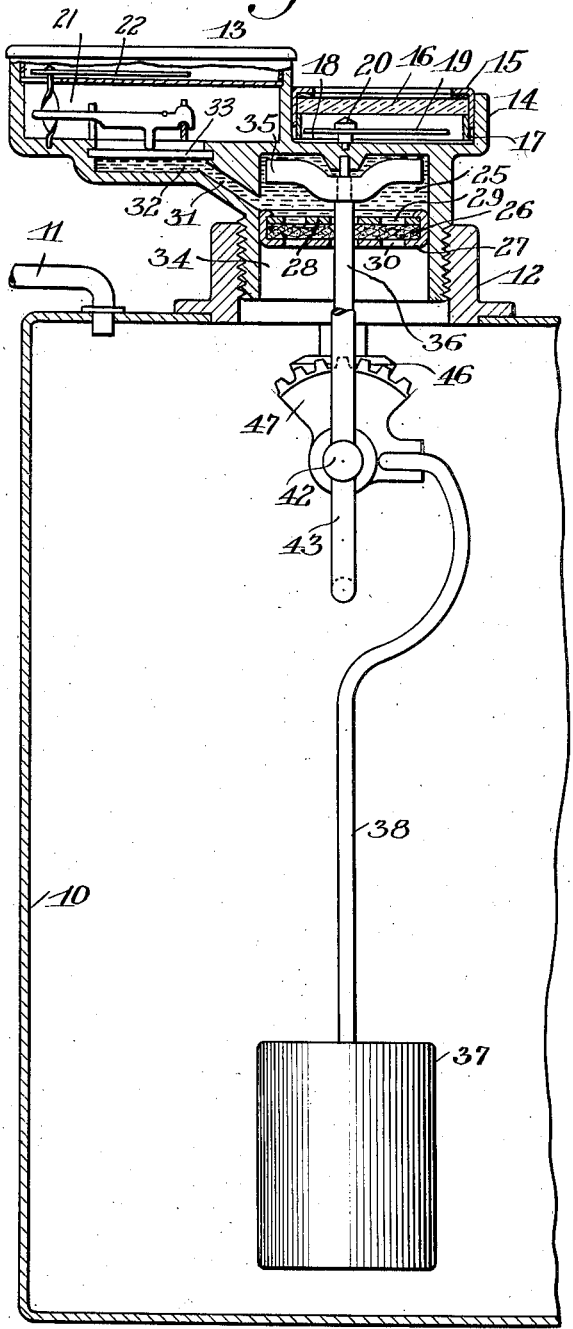
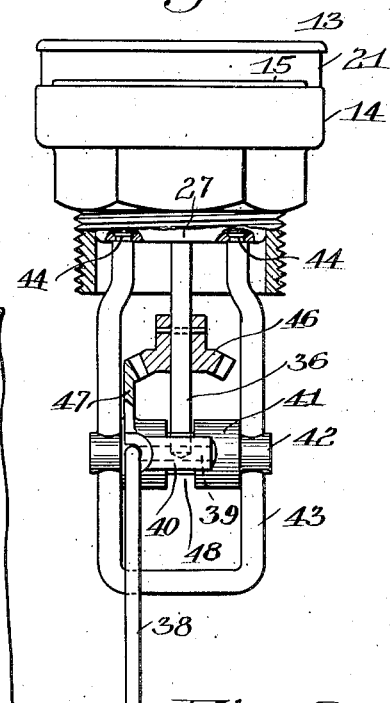
INVENTOR.
Herbert Hastings
BY Edward H Cumpston,
his ATTORNEY Patented Sept. 8, 1931

1,822,735

UNITED STATES PATENT OFFICE

HERBERT HASTINGS, OF BRIGHTON, NEW YORK, ASSIGNOR TO ROCHESTER MANUFACTURING COMPANY, OF ROCHESTER, NEW YORK, A CORPORATION OF NEW YORK

COMBINED LIQUID LEVEL AND PRESSURE INDICATING MECHANISM

Application filed November 27, 1925. Serial No. 71,567.

The present invention relates to a combined liquid level and pressure indicating mechanism and has for its object to afford improved indicating means for use in connection with liquid supply tanks where the liquid is forced from the tank preferably under the pressure of air, as in certain water supply systems where a pressure tank is employed for this purpose.

A further object of the invention is to provide improved liquid level and pressure indicating gauges combined to form a unit for connection with a pressure controlled liquid supply tank in a manner necessitating the tapping of the tank at one point only, the gauge being of such construction as to combine all of the advantages of two separate units in one instrument, whereby essential parts of one are utilized in the successful control and operation of the other.

A further object of the invention is to simplify the construction of gauges or indicating devices of the class disclosed herein whereby to reduce the cost of manufacture, as well as that of installation, by combining the several indicating parts and control means therefor so as to form a unitary device embodying a single head or fitting in which an essential feature of one indicating device is combined with and advantageously utilized in connection with the other.

To these and other ends the invention resides in certain improvements and combinations of parts, all as will be hereinafter more fully described, the novel features being pointed out in the claims at the end of the specification.

In the drawings:—

Figure 1 is a part-sectional elevation embodying one form of the invention;

Figure 2 is a fragmentary part-sectional elevation as viewed from the right of Figure 1 with the instrument detached from the tank, and Figure 3 is a top plan view of the combined liquid level and pressure indicating devices.

Similar reference numerals throughout the several views indicate the same parts.

The present invention is adapted for use with liquid supply systems of different kinds where a pressure supply apparatus is employed to effect the flow of the liquid to the desired points, as in the case of pressure controlled liquid supply systems, such as are used in different branches of industry or in water supply systems where the water is furnished under pressure of air supplied by any suitable compressing means.

As illustrative of one embodiment of the invention I employ a liquid holding tank 10 to which the liquid is supplied in any suitable manner and which is connected with a source of compressed air, not shown, by a pipe or connection 11 as shown in Figure 1. The tank is provided with a threaded collar 12 into which is screwed a head or fitting indicated generally at 13. The upper portion of the head is provided at one side with a liquid level indicating device embodying a semi-circular casing 14 adapted to receive a bezel 15 for retaining a glass cover plate 16, spacing ring 17 and dial 18. Between the dial and glass cover is pivotally mounted a pointer or indicator 19 carried by a pivot post 20, the indicator being free to move between certain limits to indicate relatively high and low liquid levels in the tank 10. The head also includes a casing 21 cast integral with the casing 14 and containing any well known pressure responsive indicating means, including the usual pointer 22 operable over a dial plate 23 having a suitably marked scale 24 for indicating the extent of variation of the pressure within the tank 10 from time to time.

The head is provided beneath the indicators with a liquid holding pressure chamber 25, the bottom of which comprises a pressure transmitting closure or diaphragm 26 preferably in the form of a liquid-proof disc supported in a cup-shaped member 27 in which it is held by a retaining plate 28 as shown in Figure 1. The plate and bottom wall of the cup-shaped member are provided with a suitable number of registering openings 29 and 30, respectively, whereby pressure in the tank is transmitted through the pressure transmitting member 26 to the liquid in the pressure chamber 25 which serves to transmit, through by-pass 31, pressure to a chamber 32 closed at its upper side by a diaphragm 33 operatively connected with the pointer 22 in any well known manner, such, for example, as shown in my prior Patent No. 1,339,117, dated December 6, 1921, for pressure gauge. Thus it will be seen that the indicator 22 is made responsive to any variations of pressure that may take place in the tank 10 from time to time. The cup-shaped member 27 is frictionally held within the bore 34 of the head 13, being forced therein under considerable pressure.

The means for operating the liquid level indicator 19 is in the form of a permanent magnet 35 rotatably mounted within the liquid confined within the pressure chamber 25 which preferably comprises a neutral oil, affording protection against the loss of magnetism by preventing rust and consequent diminution in size of the magnetized bar 35. A further advantage due to the mounting of the magnet within the pressure chamber is the economy in space afforded which results in a saving in the amount of metal used in the construction of the head.

Operation of the magnet is effected by a stem 36 projecting through the closure for the chamber 25 and having a squared portion extending through the magnet and terminating in a reduced portion projecting into a recess formed in the upper wall of the chamber whereby a bearing is provided for the stem at its upper end in addition to a lower bearing which will be hereinafter described. Operation of the stem 36 is effected by a float 37 on the lower end of a rod or arm 38 having a right angle portion 39 at its upper end rigidly secured within a recessed lug or extension 40 on a sleeve 41 rotatably mounted on an arbor 42 as shown in Figure 2. The opposite portions of a yoke 43 are projected through the ends of the arbor to form a support for the latter, the yoke in turn being supported by suitably connecting its upper end portions with the cup-shaped member 27 as indicated at 44 in Figure 2. The lower end of the stem 36 is journaled in the arbor 42, the stem having rigidly secured thereon a pinion 46 meshing with a gear segment 47 extending upwardly from one end of the sleeve 41, as shown in Figure 2. The sleeve 41 is recessed or cut away at 48 to permit it to have a limited movement upon the arbor 42, its movement in one direction being limited by engagement of the lug 40 with the stem 36 and in the opposite direction by engagement of a shoulder on the sleeve, not shown, with said stem when the float is moved in an opposite direction. Thus it will be seen that since the position of the float within the tank is dependent upon the amount of liquid therein, any variation in the amout will be indicated by the pointer 19 which will follow the movement of the magnet as its position is changed through rotation of the stem 36 by the gear segment 47 actuated by the float 37.

The head 13 and depending parts carried thereby constitute a complete unit which can be applied to or detached from the tank as such, merely by screwing or unscrewing the threaded extension of the head within the collar 12.

The resiliency of the material used in the diaphragm member 26 which is preferably constructed of felt or a suitable fiber material insures a liquid-tight joint around the stem. While this form of construction is effective for the purpose provided it will be understood that any other form of diaphragm may be employed as a closure for the pressure chamber 25.

As before stated, by combining in one head or unit the various parts of two different indicating mechanism and placing the actuating means for one indicator in an actuating medium for the other indicator, I produce an instrument in which marked advantage is derived from the standpoint of economy in manufacture, as well as improved results in operation.

I claim as my invention:

1. In a gauge, the combination with a casing having a chamber therein, of oil substantially filling said chamber, a pressure transmitting diaphragm forming a wall of said chamber and retaining said oil therein, an indicating device exteriorly of said chamber, and operating means including means extending through said diaphragm and movable within said oil filled chamber for operating said indicating device.

2. In a gauge, the combination with a casing having a chamber therein, of oil substantially filling said chamber, a pressure transmitting diaphragm forming a wall of said chamber and retaining said oil therein, an indicating device exteriorly of said chamber, and operating means including a magnet movable within said oil filled chamber and means extending through said diaphragm and projecting into said chamber for moving said magnet to operate said indicating device.

3. In a gauge, the combination with a casing having a chamber therein, of liquid substantially filling said chamber, a pressure indicating device mounted exteriorly of said chamber, a diaphragm forming a wall of said chamber and in position to be subjected to the pressure to be indicated, a second diaphragm forming a wall of said chamber in position to be affected by variations in pressure within said chamber, means operatively connecting said second diaphragm to said pressure indicating device, a liquid level indicating device exteriorly of said chamber, and operating means including means movable within said liquid filled chamber for operating said liquid level indicating device.

HERBERT HASTINGS.